(12) United States Patent
Chiaro, Jr. et al.

(10) Patent No.: US 7,870,478 B1
(45) Date of Patent: Jan. 11, 2011

(54) REPURPOSING SUBSECTIONS AND/OR OBJECTS

(75) Inventors: Joseph E. Chiaro, Jr., St. Charles, IL (US); Danny Saikaly, Ontario (CA)

(73) Assignee: Adobe Systems Incorporated, San Jose, CA (US)

( * ) Notice: Subject to any disclaimer, the term of this patent is extended or adjusted under 35 U.S.C. 154(b) by 1302 days.

(21) Appl. No.: 11/264,425

(22) Filed: Oct. 31, 2005

(51) Int. Cl.
*G06F 17/00* (2006.01)

(52) U.S. Cl. .................................................. 715/223

(58) Field of Classification Search ................ 715/221, 715/222, 223
See application file for complete search history.

(56) References Cited

U.S. PATENT DOCUMENTS

| | | | | |
|---|---|---|---|---|
| 5,282,052 | A * | 1/1994 | Johnson et al. | 358/402 |
| 5,651,108 | A * | 7/1997 | Cain et al. | 715/763 |
| 5,964,834 | A * | 10/1999 | Crutcher | 709/213 |
| 6,470,358 | B1 * | 10/2002 | Beyda et al. | 707/201 |
| 6,484,157 | B1 * | 11/2002 | Chowdhury et al. | 707/1 |
| 6,708,202 | B1 * | 3/2004 | Shuman et al. | 709/206 |
| 6,728,708 | B1 * | 4/2004 | Yotka et al. | 707/6 |
| 6,934,740 | B1 * | 8/2005 | Lawande et al. | 709/213 |
| 7,080,118 | B2 * | 7/2006 | Hildebrand | 709/203 |
| 7,168,035 | B1 * | 1/2007 | Bell et al. | 715/234 |
| 7,603,380 | B2 * | 10/2009 | Deffler | 1/1 |
| 7,653,876 | B2 * | 1/2010 | Ethier et al. | 715/249 |
| 7,734,995 | B1 * | 6/2010 | Saikaly | 715/200 |
| 2002/0002586 | A1 * | 1/2002 | Rafal et al. | 709/205 |
| 2002/0013862 | A1 * | 1/2002 | Orchard et al. | 709/315 |
| 2003/0033413 | A1 * | 2/2003 | Willson et al. | 709/227 |
| 2003/0110371 | A1 * | 6/2003 | Yang et al. | 713/100 |
| 2003/0177203 | A1 * | 9/2003 | Crook | 709/219 |
| 2004/0039990 | A1 * | 2/2004 | Bakar et al. | 715/505 |
| 2004/0070622 | A1 * | 4/2004 | Cossey et al. | 345/769 |
| 2004/0139384 | A1 * | 7/2004 | Lin | 715/500 |
| 2004/0237030 | A1 * | 11/2004 | Malkin | 715/505 |
| 2005/0027843 | A1 * | 2/2005 | Bozak et al. | 709/223 |
| 2005/0050088 | A1 * | 3/2005 | Kotler et al. | 707/102 |
| 2005/0055679 | A1 * | 3/2005 | Francis et al. | 717/139 |
| 2005/0198086 | A1 * | 9/2005 | Moore et al. | 707/204 |
| 2005/0234886 | A1 * | 10/2005 | Mohraz et al. | 707/3 |
| 2005/0273573 | A1 * | 12/2005 | Liu et al. | 711/206 |
| 2006/0047709 | A1 * | 3/2006 | Belin et al. | 707/201 |
| 2006/0069981 | A1 * | 3/2006 | Enenkiel | 715/500 |
| 2006/0130051 | A1 * | 6/2006 | Sanielevici et al. | 717/171 |
| 2006/0136422 | A1 * | 6/2006 | Matveief et al. | 707/10 |
| 2006/0224948 | A1 * | 10/2006 | Desmond et al. | 715/507 |
| 2006/0242204 | A1 * | 10/2006 | Karas et al. | 707/200 |
| 2007/0016586 | A1 * | 1/2007 | Samji et al. | 707/10 |
| 2007/0156740 | A1 * | 7/2007 | Leland et al. | 707/102 |

(Continued)

OTHER PUBLICATIONS

McCallum et al., Efficient Clustering of High-Dimensional Data Sets with Application to Reference Matching, ACM 2000, pp. 169-178.*

(Continued)

*Primary Examiner*—Cong-Lac Huynh
(74) *Attorney, Agent, or Firm*—Robert C. Kowert; Meyertons, Hood, Kivlin, Kowert & Goetzel, P.C.

(57) ABSTRACT

Briefly, in accordance with one or more embodiments, a form may be configured with one or more subsections that may be reused, and automatically be converted to a utilizable format to a second application.

47 Claims, 3 Drawing Sheets

U.S. PATENT DOCUMENTS

| | | | | |
|---|---|---|---|---|
| 2007/0266328 | A1* | 11/2007 | Vasey | 715/762 |
| 2007/0288854 | A1* | 12/2007 | Koskimies | 715/760 |
| 2008/0222514 | A1* | 9/2008 | Rivers-Moore et al. | 715/235 |
| 2009/0019111 | A1* | 1/2009 | Emmelmann | 709/203 |
| 2010/0088585 | A1* | 4/2010 | Piersol | 715/222 |

OTHER PUBLICATIONS

Lee et al., Feature-based Approach to Object-Oriented Engineering of Applicaitons for Reuse, Google 2000, pp. 1025-1046.*

Lin et al., Reengineering Windows Software Applications into Reusable CORBA Objects, Google 2004, pp. 403-413.*

Wilcock, Pipelines, Templates and Transformations: XML for Natural Language Generation, Google 2001, pp. 1-8.*

Zdun, Dynamically Generating Web Application Fragments from Page Templates, ACM 2002, pp. 1113-1120.*

* cited by examiner

REPURPOSING SUBSECTIONS AND/OR OBJECTS

BACKGROUND

There may be many websites that allow a user to input information that may be later used in a report and/or form. One form may require many files, which may be difficult to maintain. Furthermore, many forms and interfaces may need to be created to receive and present data from one user. Difficulties may arise in the configuration of the form, the maintenance of the form, and/or the complexity of converting between formats of the respective application programs.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
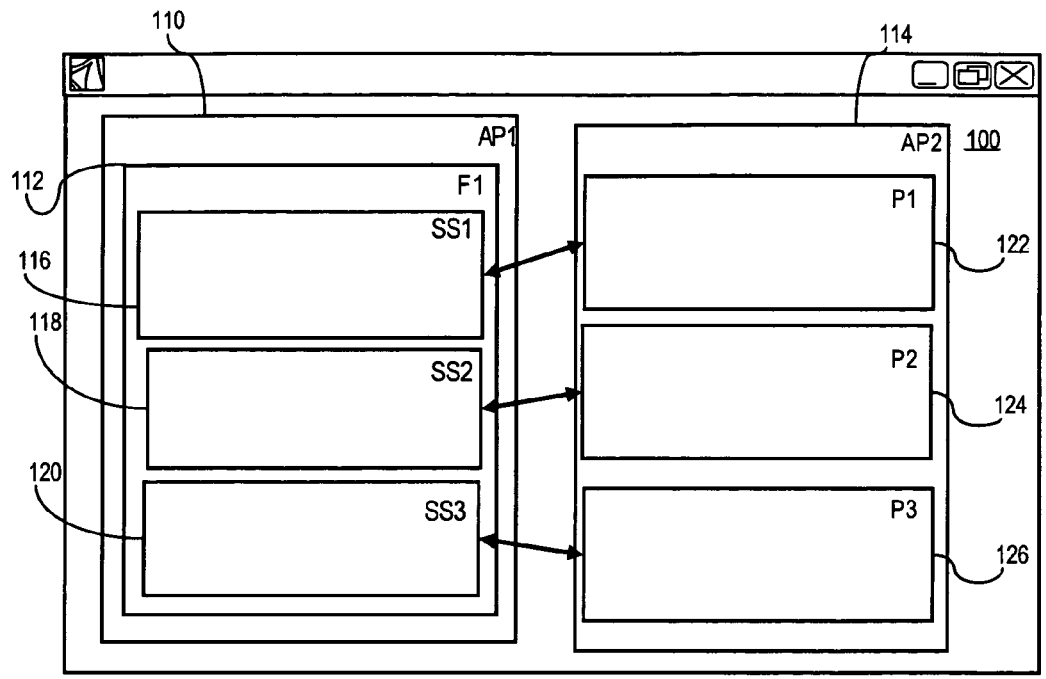
FIG. 1 is a diagram of a file in a first application, and corresponding pages in a second application in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These algorithmic descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects.

In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. However, these are merely example definitions of terms relating to graphical user interfaces and/or computing platforms and/or the like, and the scope of claimed subject matter is not limited in this respect.

XML may refer to eXtensible Markup Language and XDP may refer to an XML data package. XDP files may be XML files that may contain XML form data, XML form templates, PDF documents, and/or other XML information. They may work with enterprise applications via common XML tools and Web services, among others.

Referring now to FIG. 1, a diagram of a file including one or more interfaces, applications programs, subsections, and pages in accordance with one or more embodiments will be discussed. As shown in FIG. 1, interface 100 may comprise subsections, pages, and/or other objects displayed in and/or controlled by application programs 110, 114. In one embodiment, application programs 110, 114 may comprise an Adobe® Acrobat®, and/or Adobe® Designer® type program available from Adobe Systems Incorporated of San Jose, Calif., USA, and form 112 and/or subsections 116, 118, and 120 may comprise an Adobe® Portable Document Format (PDF) type file, although the scope of claimed subject matter is not limited in these respects.

In one embodiment, form 112 and/or subsections 116, 118, and 120 may be authored and/or created in a page description language (PDL), which refers to a language for describing a layout and/or contents of a page to be displayed and/or printed. Such a page description language may comprise, for example, Adobe® PostScript® available from Adobe Systems Incorporated. PostScript®, for example, describes a page in terms of page objects including textual objects and/or graphical objects such as lines, arcs, and/or circles. PostScript® may be used, for example, to create Portable Document Format type files, although the scope of claimed subject matter is not limited in this respect. In another embodiment, first application program 110, may be a word processor and/or a text processor, for example Microsoft® Word® available from Microsoft Corporation of Redmond, Wash., USA, and form 112 and/or subsections 116, 118, and 120 may be a Microsoft® Word® type file in a DOC format, although the scope of claimed subject matter is not limited in this respect. In yet another embodiment, second application program 114, may comprise a web browser to open and/or display web pages, and pages 122, 124, 126 may comprise a Hyper Text Markup Language (HTML) type file. In such an embodiment, second application program 114 may comprise, for example, a Microsoft® Internet Explorer® web browser available from Microsoft Corporation, or alternatively may be, for example, a Firefox web browser available from the Mozilla Foundation of Mountain View, Calif., USA, although the scope of claimed subject matter is not limited in this respect.

In one embodiment, form (F1) 112, and/or subsections 116, 118, 120 may be created in response to a command from a user via a user interface and/or graphical design interface, such as, but not limited to an Adobe® Designer® type program available from Adobe Systems Incorporated of San Jose, Calif., USA. In an embodiment, subsections 116, 118, 120 may be configured to be at least partially directly and/or automatically converted to an HTML page. This may save user time in that a form and separate HTML pages do not have to be created and maintained. Furthermore, this configuration may allow data to be entered and passed from one application to another, and allow subsections to be reusable between applications and/or forms.

Form 112 may include a XDP-type format, configured with a structured XML format, and may comprise fillable fields configured to capture information from a GUI. Subsections 116, 118, and 120 may be various objects grouped together. The grouping of object may include selecting all objects to be grouped, then initiating a command to group them together. The subsection and its properties may then be stored as a single grouping such that the subsection may be moved and/or copied to other applications and/or forms. The form may be configured with one or more subsections that may be reused within other forms, which may make the form a reusable template of subsections, if desired. The subsection may include properties such as, but not limited to, name of the subsection, size, if the subsection is to expand to fit, orientation within the form, color, number of objects within the subsection, and type of objects within the subsection, among many others.

In this embodiment form 1 (F1) 112 may include one or more subsections, in this case three subsections, subsection 1 (SS1) 116, subsection 2 (SS2) 118, and subsection 3 (SS3) 120. These subsections may be created in response to receiving a command from a user interface. Form 1 112 may be created as an XML data package. Subsections 116, 118, 120 may also be configured to be reusable in other applications, forms, and/or XML data packages. Furthermore, these subsections may be configured to be converted to a page and/or subsection of second application program (AP2) 114. As shown in this embodiment, subsections 1 116 may be at least partially automatically converted to a second format of page 1 (P1) 122 in second application program 114. In an embodiment, second application program 114 may be a type that may utilize HTML, however other types may be utilized without straying from the concepts disclosed herein. Page 1 122 may then be edited, and/or data added to page 1 122. Page 1 122 may then be automatically converted back to the format of application 1 112 as a subsection 1 116.

Similarly subsection 2 118 may be converted to page 2 124, and subsection 3 120 may be converted to page 3 126 of the second format of second application program 114. Page 2 124 and page 3 126 may then be edited and/or changed, then converted back to the first format of first application program. Page 2 124 may be interactive in that a user may edit Page 2 124 in response to suggestions or wizard-type functionality. This may allow a user to maintain all related form and/or subsection information in one file. Furthermore, it may allow for easier edit and/or transfer of data between applications. Although three subsections are shown in this embodiment, other numbers of subsections may be utilized without straying from the concepts of this disclosure.

Figure 2:
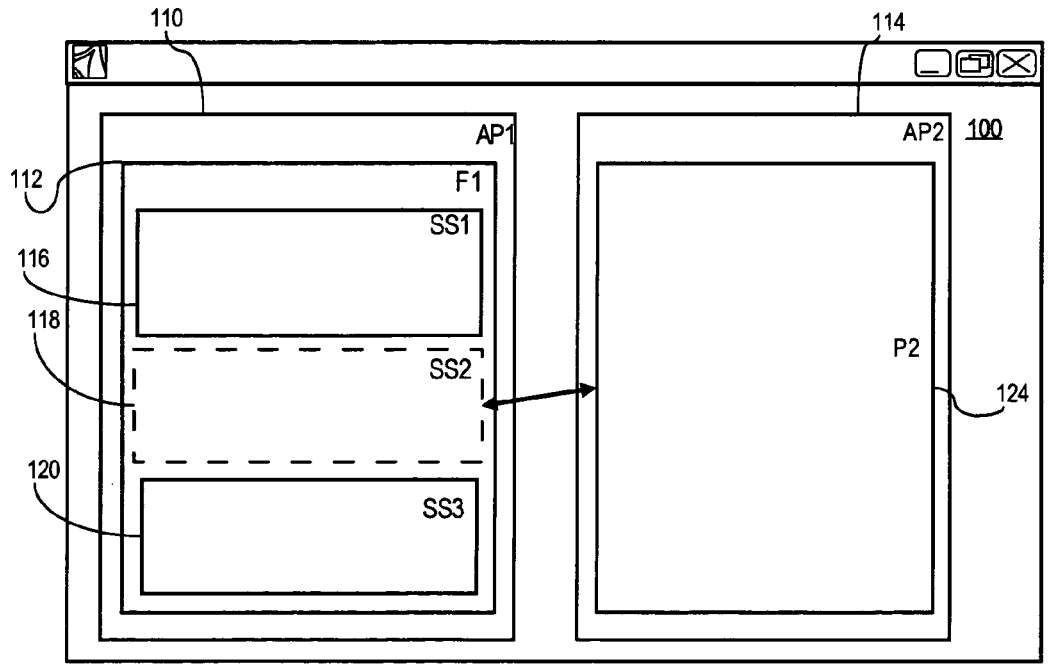
FIG. 2 is a diagram of a system for repurposing XML data packages in accordance with one or more embodiments.

As shown in FIG. 2, subsection 2 118 may be moved, copied, and/or converted to page 2 of a second format in second application program 114, while other subsections 116, 120 remain in the first application program 112. This may allow a user to edit portions of a form 112 while other subsections 116, 120 are not converted or edited. This may reduce computing resources, computing time, and user time. Subsections 116, 118 120 may also be configured to be reusable in other forms, programs, and/or objects, among others. First application program 112 may utilize a PDF or DOC format, and second application 114 may utilize an HTML format, however, many other formats may be utilized without straying from the concepts disclosed herein.

Figure 3:
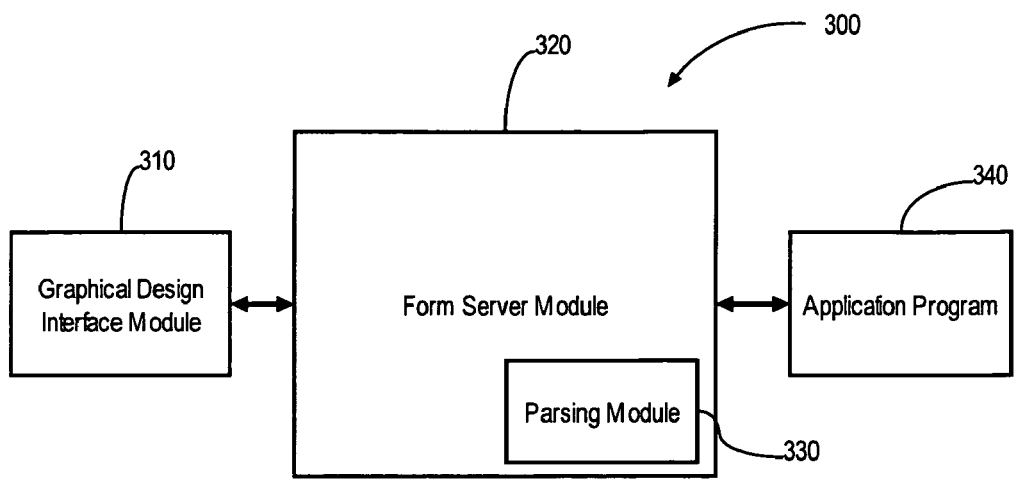
FIG. 3 is a flow diagram of a process for repurposing XML data packages in accordance with one or more embodiments.

FIG. 3 may show a system 300 for creating subsections, and/or converting the subsections to a second format, in accordance with an embodiment. System 300 may include a graphical design interface module (GDI) 310. GDI 310 may be configured to receive user inputs and configure forms and/or subsections in a first format, among other functionality. GDI 310 may be Adobe® Designer® type, Microsoft® Word®, or other type GDI. The first format may be PDF or DOC format, among many others.

System 300 may also include a form server 320. Form server 320 may be configured to receive a subsection in a first format from GDI 310. Further, form server 320 may utilize a parsing module 330 and may automatically convert the received subsection to a page in a second format useable by application program 340. Form server 320 may also be configured to send the page in the second format to an application program 340. Application program 340 may be configured to receive and edit the page, and to send a page back to the form server 320, among many other functionalities.

Form server 320 may then receive a page from application program 340 and convert it back to a format useable by GDI 310. Form server may utilize parsing module 330 to accomplish the conversion. In an embodiment, the form and subsections may be created in a PDF format, with each subsection being converted to an HTML page. The HTML page may then be edited in application program 340. The HTML page may then be converted back to a subsection in a PDF form by form server 320.

Figure 4:
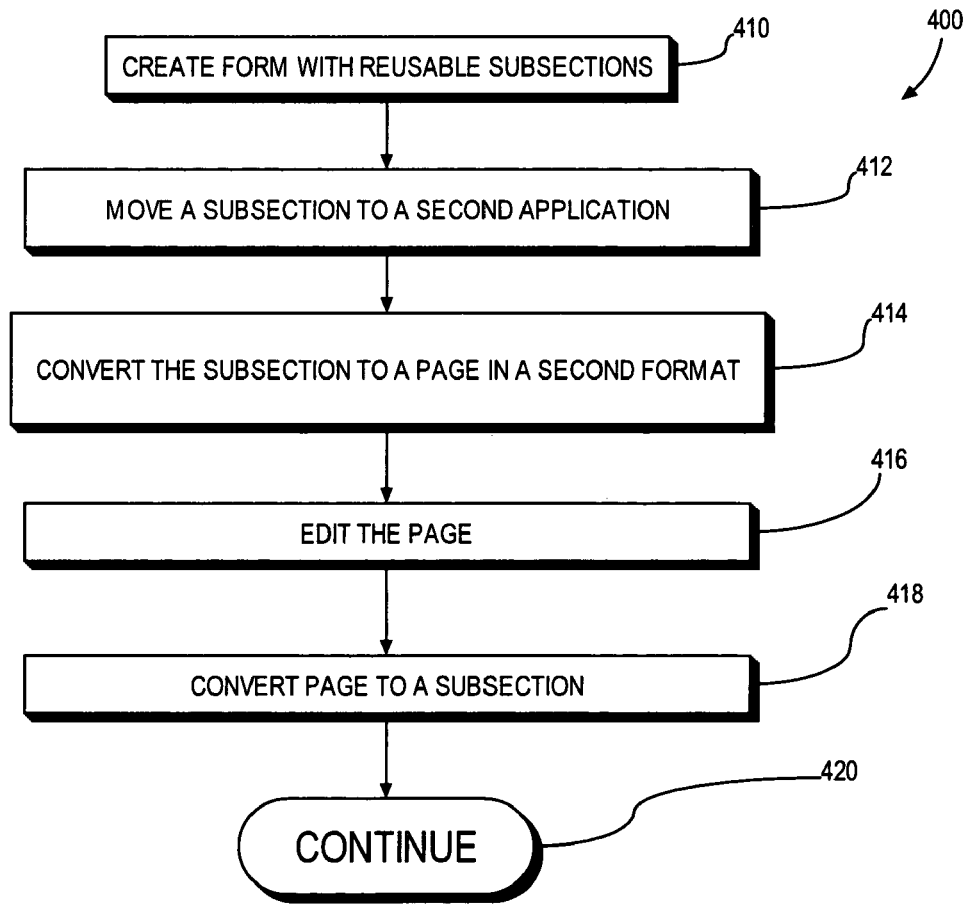
FIG. 4 is a block diagram of a computing platform capable of executing repurposing XML data packages in accordance with one or more embodiments.

Referring now to FIG. 4, a flow diagram of a process 400 for creating subsections and converting the subsections to pages of a second format in accordance with one or more embodiments will be discussed. In one or more embodiments, process 400 may include blocks 410 through 420, more blocks and/or fewer blocks than shown in FIG. 4. Furthermore, the order of blocks 410 through 420 is merely one order of blocks, wherein process 400 may include one or more alternative orders of blocks 410 through 420, and the scope of claimed subject matter is not limited in this respect.

A form 112 having one or more subsections 116, 118, 120, in a first format, may be created at block 410. The creation of a form and one or more subsections may be in response to a user input via GDI 310. The subsections 116, 118, 120 may be moved to a second application at 414. The subsections 116, 118, 120 may be automatically or at lest partially automatically converted to pages in a second format. The pages in a second format may be edited at 416 by a second application. The pages may be converted 418 back to subsections in the first format. The subsections 116, 118, 120 may be reinserted onto the form. The subsections 116, 118, 120 may also be reused in an application with the first format. Furthermore, subsections 116, 118, 120 may be converted to many other formats for editing.

Automatically may include conversion of subsections to pages, and/or visa versa without receiving an input from a user and/or user interface. The creating and converting of forms, subsections, and/or pages as described with respect to FIG. 400 is merely an example of a method for creating subsections and converting the subsections to pages and/or other objects, and other alternative embodiments and/or implementations may be made.

Figure 5:
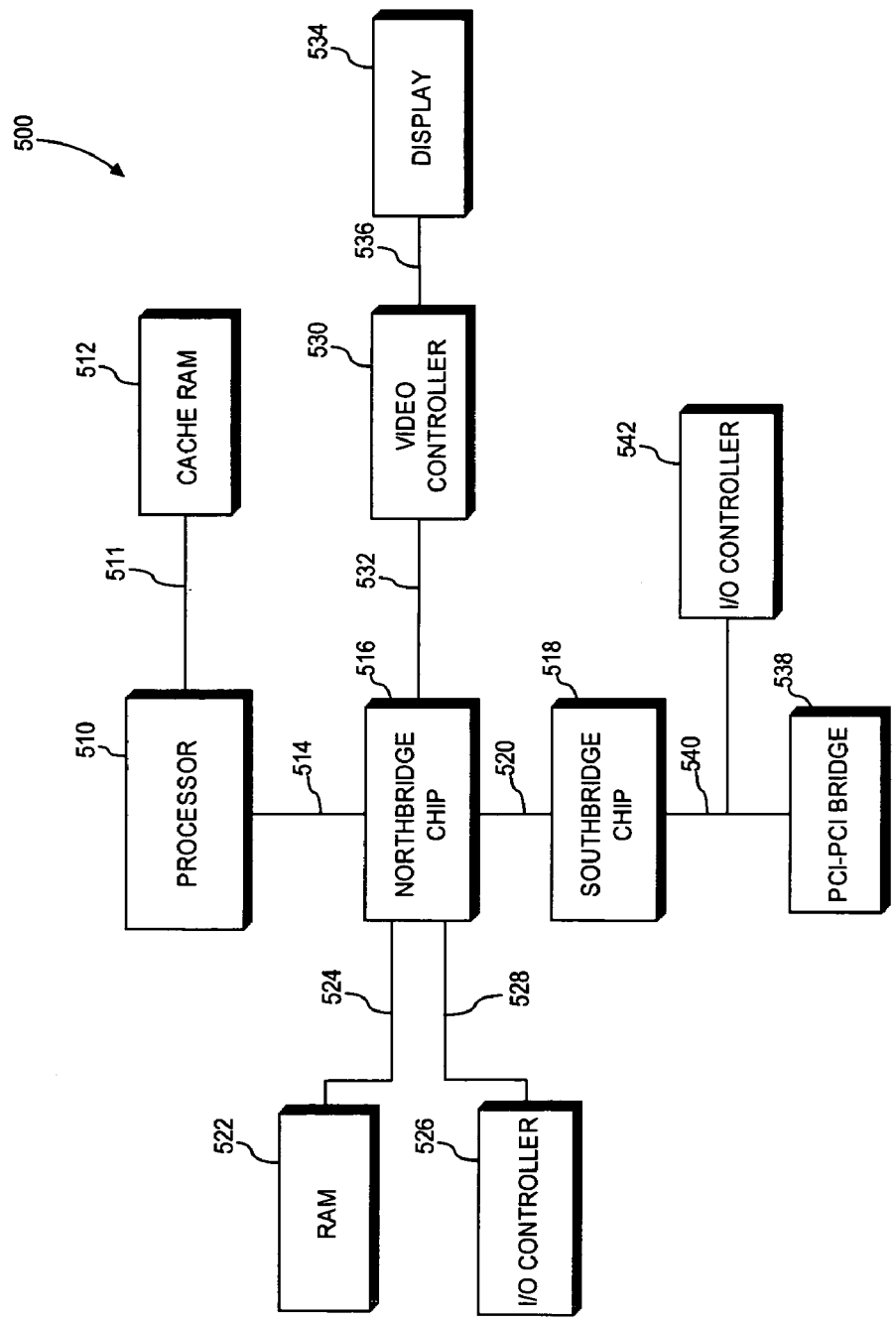
FIG. 5 is a block diagram of a computing platform capable of executing content reflow in response to an object resize event in accordance with one or more embodiments.

Referring now to FIG. 5, a block diagram of a computing platform capable of executing content reflow in response to an object resize event in accordance with one or more embodiments will be discussed. It should be noted that computing platform 500 of FIG. 5 is merely one type of computing platform, and other computing platforms having more and/or fewer components than shown in FIG. 5 may be implemented, and the scope of claimed subject matter is not limited in this respect. In one or more embodiments, computing platform 500 may be utilized to implement process 400 in whole and/or using more and/or fewer blocks than shown in FIG. 4, and the scope of claimed subject matter is not limited in this respect. Computing platform 500 may include processor 510 coupled to cache random access memory (RAM) 512 via back side bus 511. Processor 510 may also couple to a chipset that includes Northbridge chip 516 via front side bus 514, and also to Southbridge chip 518 via bus 520. In one embodiment, Northbridge chip 516 in general may be utilized to connect a processor to memory, to an input/output bus, to a video bus, and to Level 2 cache, although the scope of claimed subject matter is not limited in this respect.

In one embodiment, Southbridge chip 518 may be utilized to control input/output functions, the basic input/out system (BIOS), an interrupt control functions of Integrated Drive Electronics (IDE) devices such as hard disks or compact disk-read only memory (CD-ROM) devices or the like, although the scope of claimed subject matter is not limited in this respect. Random access memory (RAM) 522 may couple to Northbridge chip 516 via main memory bus 524, and input/output (I/O) controller 526 may also couple to Northbridge chip 516 via I/O bus 528. In one embodiment, I/O controller 526 and I/O bus 528 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 526 and I/O bus 528 may be in compliance with a Peripheral Component Interconnect (PCI) bus, although the scope of claimed subject matter is not limited in this respect.

Video controller 530 may couple to Northbridge chip 516 via video bus 532, which in one embodiment may comprise an Accelerated Graphics Port (AGP) bus, although the scope of claimed subject matter is not limited in this respect. Video controller 530 may provide video signals to an optionally coupled display 534 via display interface 536 which in one embodiment may comprise a Digital Visual Interface (DVI) in compliance with a standard promulgated by the Digital Display Working Group, although the scope of claimed subject matter is not limited in this respect. Southbridge chip 518 may couple to a peripheral component interconnect to peripheral component interconnect (PCI-PCI) bridge 538 via input/output bus 540, which may in turn couple to I/O controller 542 to control various peripheral devices such as Universal Serial Bus (USB) devices, or devices compatible with an Institute of Electrical and Electronics Engineers (IEEE) 1394 specification, although the scope of claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to repurposing of subsection objects and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   creating a first form template for a first application of a first format, wherein the first form template comprises one or more objects, wherein each one of the one or more objects is a portion of the first form template that is less than the entire first form template, wherein the first form template comprises a structure such that each one of the one or more objects are structured as a different XML subsection to be removable, independent of other portions of the first form template, from the first form template, wherein each one of the one or more objects is reusable for other form templates for applications that have a format that is different from the first format of the first application; and
   creating a second form template for a second application of a second format, wherein the second format is different from the first format, and wherein said creating comprises copying the one or more objects from the first form template into a structure of the second form template configured to accept copied objects.

2. The method of claim 1, further comprising converting at least one of the one or more objects to a first page in the second format of the second application.

3. The method of claim 1, wherein the first application comprises a word processor application.

4. The method of claim 3, wherein the one or more objects are converted to an HTML page.

5. The method of claim 3, wherein the HTML page is interactive.

6. The method of claim 1, wherein one of the one or more objects is moved or copied into the second format of the second application, as an object.

7. The method of claim 1, wherein the second format comprises a markup language type format.

8. The method of claim 1, wherein the first form template and the other form templates are XML data packages.

9. The method of claim 1, wherein the first format is an image format.

10. The method of claim 1, wherein the first format comprises a PDF-type format.

11. A method, comprising:
    receiving an input to create a first form template for a first application of a first format, wherein the first form template comprises one or more objects, wherein each one of the one or more objects is a portion of the first form template that is less than the entire first form template, wherein the first form template comprises a structure such that each one of the one or more objects are structured as a different XML subsection to be removable, independent of other portions of the first form template, from the first form template, wherein each one of the one or more objects is reusable for other form templates for applications that have a format that is different from the first format of the first application; and
    receiving an input to create a second form template for a second application of a second format, wherein the second format is different from the first format, and wherein said creating comprises copying the one or more objects from the first form template into a structure of the second form template configured to accept copied objects.

12. The method of claim 11, further comprising converting one of the one or more objects to a second page in the second format of the second application.

13. The method of claim 12, wherein said converting is accomplished at least in part automatically.

14. The method of claim 11, wherein the first application comprises an Adobe® Designer-type application or a Microsoft® Word®-type application.

15. The method of claim 11, wherein the first application comprises a word processor application.

16. The method of claim 11, wherein the first format is an image format.

17. The method of claim 11, wherein the first format is a PDF format.

18. The method of claim 11, wherein the second format comprises a markup language type document.

19. The method of claim 11, wherein the one or more objects are converted to an HTML page.

20. The method of claim 19, wherein the HTML page is interactive.

21. The method of claim 19, further comprising editing the HTML page.

22. The method of claim 11, further comprising configuring the first form template in a single file.

23. The method of claim 11, wherein the first form template and the other form templates are XML data packages.

24. The method of claim 11, further comprising using at least one of the one or more objects of the first form template to create one or more additional form templates having at least one of the one or more objects.

25. A computer program product comprising:
    a storage medium having instructions executable by a computing platform to:
    receive an input to create a first form template for a first application of a first format, wherein the first form template comprises one or more objects, wherein each one of the one or more objects is a portion of the first form template that is less than the entire first form template, wherein the first form template comprises a structure such that each one of the one or more objects are structured as a different XML subsection to be removable, independent of other portions of the first form template, from the first form template, wherein each one of the one or more objects is reusable for other form templates for applications that have a format that is different from the first format of the first application; and receive an input to create a second form template for a second application of a second format, wherein the second format is different from the first format, and wherein said creating comprises copying the one or more objects from the first form template into a structure of the second form template configured to accept copied objects.

26. The product of claim 25, wherein said instructions are further executable to convert one of the one or more objects to a second page in the second format of the second application.

27. The product of claim 26, wherein said conversion of said one of the one or more objects is accomplished at least in part automatically.

28. The product of claim 25, wherein the first format is an image format.

29. The product of claim 25, wherein the first format is a PDF format.

30. The product of claim 25, wherein the first format is a word processor type format.

31. The product of claim 25, wherein the second format comprises a markup language type document.

32. The product of claim 25, wherein said instructions are further executable to convert the one or more objects to a HTML page.

33. The product of claim 32, wherein the markup language page is interactive.

34. The product of claim 32, wherein said instructions are further executable to edit the markup language page.

35. An apparatus, comprising:

means, comprising a processor, for creating a first form template for a first application of a first format, wherein the first form template comprises one or more objects, wherein the first form template comprises a structure such that each one of the one or more objects are structured as a different XML subsection to be removable, independent of other portions of the first form template, from the first form template, wherein each one of the one or more objects is reusable for other form templates for applications that have a format that is different from the first format of the first application; and means, comprising said processor, for creating a second form template for a second application of a second format, wherein the second format is different from the first format, and wherein said creating comprises copying the one or more objects from the first form template into a structure of the second form template configured to accept copied objects.

36. The apparatus of claim 35, further comprising means for converting one of the one or more objects to a second page in the second format of the second application.

37. The apparatus of claim 36, wherein said converting means perform the converting at least in part automatically.

38. The apparatus of claim 35, wherein the first format is an image format.

39. The apparatus of claim 35, wherein the first format is a PDF format.

40. The apparatus of claim 35, wherein the second format comprises a markup language type format.

41. The apparatus of claim 35, wherein the one or more objects are converted to a HTML page.

42. The apparatus of claim 41, further comprising editing the markup language page.

43. A system for repurposing XML data packages, comprising:

one or more processors programmed with instructions to provide:

a graphical design interface configurable to create a first form template for a first application of a first format, wherein the first form template comprises one or more objects, wherein each one of the one or more objects is a portion of the first form template that is less than the entire first form template, wherein the first form template comprises a structure such that each one of the one or more objects are structured as a different XML subsection to be removable, independent of other portions of the first form template, from the first form template, wherein each one of the one or more objects is reusable for other form templates for applications that have a format that is different from the first format of the first application; and a form server configurable to create a second form template for a second application type of a second format, wherein the second format is different from the first format, and wherein said creating comprises copying the one or more objects from the first form template into a structure of the second form template configured to accept copied objects.

44. The system of claim 43, wherein the form server is configurable to convert one of the one or more objects to a first page in the second format of the second application at least in part automatically.

45. The system of claim 43, wherein the first format comprises an image type format.

46. The system of claim 43, wherein the first format comprises a word processor type format.

47. The system of claim 43, wherein the second format comprises markup language type format.

\* \* \* \* \*